US009410721B2

(12) United States Patent
Cravens

(10) Patent No.: US 9,410,721 B2
(45) Date of Patent: *Aug. 9, 2016

(54) CERAMIC HEATING ELEMENT

(71) Applicant: Brown-Cravens-Taylor, Sebastopol, CA (US)

(72) Inventor: Dennis Cravens, Cloudcroft, NM (US)

(73) Assignee: Brown Cravens Taylor, Sebastopol, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/920,358

(22) Filed: Jun. 18, 2013

(65) Prior Publication Data

US 2013/0276770 A1  Oct. 24, 2013

Related U.S. Application Data

(63) Continuation of application No. 12/872,750, filed on Aug. 31, 2010, now Pat. No. 8,485,791.

(60) Provisional application No. 61/238,587, filed on Aug. 31, 2009.

(51) Int. Cl.
*F24J 1/00* (2006.01)
*F04B 37/02* (2006.01)
*H02K 44/00* (2006.01)
(Continued)

(52) U.S. Cl.
CPC ............. *F24J 1/00* (2013.01); *C04B 35/486* (2013.01); *F04B 37/02* (2013.01); *H01M 8/1213* (2013.01); *H02K 44/00* (2013.01); *H02K 44/04* (2013.01); *C04B 35/50* (2013.01); *C04B 2235/3215* (2013.01); *C04B 2235/3229* (2013.01); *C04B 2235/94* (2013.01); *H01M 4/9066* (2013.01)

(58) Field of Classification Search
CPC ........ F04B 37/02; H02K 44/02; H02K 44/04; F24J 1/00
USPC ............................... 429/434, 523; 417/48–50
See application file for complete search history.

(56) References Cited

U.S. PATENT DOCUMENTS 3,150,483 A * 9/1964 Mayfield et al. ................ 60/202
4,023,065 A * 5/1977 Koloc ........................... 376/144
(Continued)

FOREIGN PATENT DOCUMENTS

EP    1785999    5/2007

OTHER PUBLICATIONS

Cravens, D. Factors Affecting the Success Rate of Heat Generation of CF Cells, Fourth International Conference on Cold Fusion. 1993. Lahaina, Maui: Electric Power Research Institute.
(Continued)

*Primary Examiner* — Alexander Comley
(74) *Attorney, Agent, or Firm* — Fish & Tsang LLP

(57) ABSTRACT

A heating element that includes a ceramic material doped with various elements is described. The heating element can be heated by forcing a fuel to flow through the ceramic material, where the fuel interacts with the dopants. The interaction can produce energy in the form of heat. Inventive aspects of the present material include apparatus and methods for modulation of the heat energy, physical features providing for an increase in the rate of heat release, optimization of materials and material morphology for quantity and efficiency of heat release and provision for fueling and maintenance.

14 Claims, 3 Drawing Sheets

(51) Int. Cl.
  *H02K 44/04*   (2006.01)
  *C04B 35/486*  (2006.01)
  *H01M 4/90*    (2006.01)
  *H01M 8/12*    (2016.01)
  *C04B 35/50*   (2006.01)

(56) References Cited

U.S. PATENT DOCUMENTS

| | | | | |
|---|---|---|---|---|
| 4,039,352 | A * | 8/1977 | Marinescu | 136/205 |
| 4,235,668 | A * | 11/1980 | Bass et al. | 376/137 |
| 5,026,681 | A * | 6/1991 | Hed | 505/165 |
| 5,509,888 | A * | 4/1996 | Miller | 600/29 |
| 5,827,620 | A * | 10/1998 | Kendall | 429/441 |
| 2004/0151957 | A1 * | 8/2004 | Brooks et al. | 429/20 |
| 2004/0166380 | A1 * | 8/2004 | Gorte et al. | 429/12 |
| 2007/0179041 | A1 * | 8/2007 | Muroi et al. | 501/103 |
| 2008/0123793 | A1 * | 5/2008 | Loan et al. | 376/156 |
| 2009/0166214 | A1 * | 7/2009 | Tao et al. | 205/334 |
| 2011/0005506 | A1 | 1/2011 | Rossi | |

OTHER PUBLICATIONS

Cravens, D. and D. Letts. Practical Techniques in CF Research—Triggering Methods, PowerPoint slides. Tenth International Conference on Cold Fusion. 2003. Cambridge, MA: LENR-CANR.org.
Cravens, D. and D. Letts. Practical Techniques in CF Research—Triggering Methods. Tenth International Conference on Cold Fusion. 2003.
Cravens, D. and D. Letts. The Enabling Criteria of Electrochemical Heat: Beyond Reasonable Doubt. ICCF-14 International Conference on Condensed Matter Nuclear Science. 2008. Washington, DC.
Patent Cooperation Treaty, Notification of Transmittal of the International Search Report and the Written Opinion of the International Search Authority, or the Declaration, PCT/US2011/049648, Jan. 31, 2012.

* cited by examiner

From "Anomolous effects in charging of Pd powders with high density hydrogen isotopes", Kitamura, et al. Physics Letters A, Aug 24, 2009.

Arata and Zhang recently reported that highly pure D2 gas charging of Pd nano-powders in the form of Pd/ZrO2 *nanocomposite* induced significantly higher temperatures inside the reactor vessel than on the outside wall for more than 50 hours.

CERAMIC HEATING ELEMENT

This application is a continuation of U.S. patent application having Ser. No. 12/872,750 filed Aug. 31, 2010 which claims the benefit of priority to U.S. provisional application having Ser. No. 61/238,587 filed on Aug. 31, 2009. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is heating technology.

BACKGROUND

The production of heat has been historically accomplished directly or indirectly by the burning or oxidation of chemical fuel, by friction, by alternative energy sources such as conversion of solar or wind power, or by nuclear energy, specifically fission. While each has certain advantages, these techniques either consume rare or increasingly scarce fuel or use renewable but unreliable sources. Nuclear energy via fission has the disadvantage of nuclear waste. What is needed is a source of heat using fuel continuously available in essentially unlimited quantities.

Therefore, there remains a considerable need for methods, systems, and configurations to provide elements capable of generating energy output.

SUMMARY OF THE INVENTION

The inventive subject matter provides apparatus, systems and methods in which one can generate heat through forcing an interaction of a fuel and dopant within a material that is porous to the fuel. One aspect of the inventive subject matter includes a heat-generating apparatus comprising a main body formed from a porous material where the material is porous with respect to fuel. Preferred fuels are susceptible to electro-magnetic fields. The main body can also include one or more field control points that are at least partially embedded into the main body. The control points can be configured to generate a driving field that causes the fuel to flow or otherwise move within the main body. The interaction rate of the fuel and dopant can be increased by including at least one constriction point within the main body. In some embodiments, the main body can comprise a ceramic material shaped in the form of a torus where the control points cause the fuel to flow around the torus. Another aspect of the inventive subject matter can include a heating system comprising an array of multiple heat-generating apparatus as described above.

Various objects, features, aspects and advantages of the inventive subject matter will become more apparent from the following detailed description of preferred embodiments, along with the accompanying drawing figures in which like numerals represent like components.

DETAILED DESCRIPTION

One aspect of the inventive subject matter includes a solid state matrix, preferably comprising a ceramic material, forming a main body of a heating element. In a preferred embodiment, the material composing the main body is porous with respect to a fuel compound. Preferred fuel compounds are susceptible to a driving field, preferably an electro-magnetic driving field. For example, a fuel compound could be ionized or polarized. A driving field would then cause the fuel compound to move. The main body preferably includes one or more control points configured to generate a driving field capable of moving the fuel compound within the main body of the element. Furthermore, the material composing the main body can include one or more dopants.

Without being limited to one or more theories, it is thought that the interaction between the fuel compound and the dopants generate heat. The heat generated can be increased by causing the fuel to move within the main body under the influence of the driving fields. It is also thought that the fuel would be consumed through the interactions resulting in a waste material that could be removed. It is contemplated that the waste material could be of value as well.

The inventive aspects of the subject matter include apparatus and methods for modulation of the energy, physical features providing for an increase in the rate of energy release, optimization of materials for quantity and efficiency of heat release and provision for fueling and maintenance. Preferably the energy released is in the form of heat. The inventive subject matter is also considered to include controlling or otherwise managing production of waste material.

Figure 1:
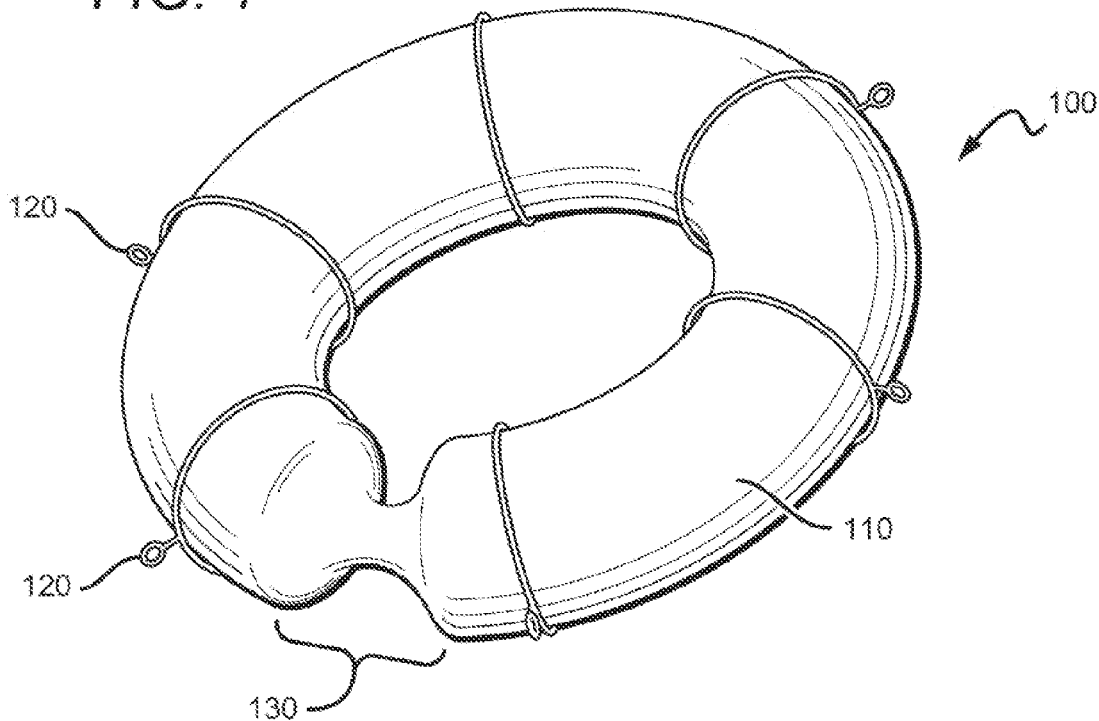
FIG. 1 is a schematic of a possible ceramic heating element having control points.

FIG. 1 presents one possible embodiment of a contemplated element 100. Main body 110 is preferably constructed of materials considered porous to a fuel compound and including a dopant. Main body 110 can be heated, assuming proper conditions have been met, through application of one or more driving fields through control points 120. Control points 120 are preferably in electrical communication with driver elements and are synchronized via a control element. However, it is contemplated that driving fields could include other fields include sono wave pulses, vibrational manipulation, wave compression, gas pressure, or other non-electromagnetic fields. The driving fields force the fuel compound through main body 110 and over the dopants, which interacts with the fuel compound to produce heat. It is also contemplated that a system comprising element 100 can include a feedback element that provides feedback information to the control element. The control element can utilize the feedback information to adjust the driving fields to manage heat production.

Other contemplated embodiments of a heating system include providing a fuel inlet, which can supply fuel to main body 110, or a waste outlet to remove waste materials. In some embodiments, main body 110 can be in a bath of the fuel. In other embodiments, main body 110 could be partially loaded with fuel where the fuel would be consumed internal to body 110.

It is also contemplated that a coating material can cover main body 110, where the coating material is less porous to the fuel compound. In such an embodiment, leakage of the fuel from main body 110 is reduced by retaining the fuel within main body 110.

As shown in FIG. 1, main body 110 can include one or more constriction regions 130. Constriction regions are thought to channel fuel flow through a more tortuous path in main body 110 and cause greater interaction with the dopants. Additionally, constriction regions 130 are considered to increase the flux density of the fuel as driven by the driving fields. Constriction regions 130 can be macroscopic as shown, having dimensions greater than $10^{-4}$ meters, or microscopic, having dimensions less than or equal to $10^{-4}$ meters. Macroscopic regions 130 can be formed via a suitable molding process of a ceramic. Microscopic regions 130 can be formed through discontinuities in a lattice structure of a preferred ceramic.

Although a single constriction region 130 is shown in FIG. 1, one should appreciate that all configurations are contemplated including one, two, three or more constriction regions 130. Main body 110 could comprise a homogenous set of constriction regions 130, or could comprise a heterogeneous mix of construction regions 130. Regions 130 could also be formed by having variable densities of material forming main body 130. All other configurations or combinations of configurations are also contemplated.

FIG. 1 presents element 100 in the form of a torus having single constriction region 130. One should also appreciate that element 100 could have different geometries to fit a target application. For example, main body 110 could form a rod, block, grate, or other geometries. It is also contemplated that multiple elements 100 can be combined to form a larger heating element system, possibly in a two dimensional array or a three dimensional array.

In a preferred embodiment, main body 110 comprises Zirconium Oxide, oxides of Barium and Cerium, or other materials capable of allowing a fuel compound to move through the material. Main body 110 is preferably configured to withstand high temperatures greater than 500 degrees Celsius without substantial degradation, more preferably greater than 1000 degrees Celsius, and yet more preferably greater than 2000 degree Celsius. For example, a ceramic comprising Zirconium Oxide can support operating temperatures greater than 2400 degrees Celsius.

Preferred dopants can include Palladium, Nickel, Thorium or other metallic compounds or alloys. Preferred fuels comprise Hydrogen, Deuterium or other isotopes of hydrogen that can be at least partially ionized or polarized. It is contemplated that other fuels could be used in conjunction with the same or different dopants, as well as the same or different material used the main body.

In yet other embodiments, the material composing main body 110 can include dopants having additional properties beyond interacting with the fuel to produce heat. One example property includes providing a measurable signaling event that indicates an interaction has taken place. Dopants that provide such a measurable signaling event are referred to as a "witnessing agent." The signaling event can include phonon emission, photon emission, or possibly a particle emission of some form. Example witnessing agents can include Uranium, Thorium, Silver, or other possible agent capable of generating a signaling event when in the presence of a fuel—dopant interaction. One should appreciate that the signaling event can be used as feedback information that can be used to control the amount of heat generated by adjusting the driving fields appropriately.

Field control points 120 can comprise electrodes of a conductive material preferably capable of withstanding potentially high operating temperatures. In some embodiments, field control points 120 can be constructed in a manner which can change state at a desired operating point (e.g., a temperature) in a way that further reactions are discouraged and heat production declines, thus representing a fail-safe operating principle. It some embodiments, field control points 120 comprise a mesh or a screen embedded within main body 110. The number, shape, or configuration control points 120 can be adjusted as necessary for a desired application.

Driver elements can be configured to withstand the desired operating voltages and currents required for driving the necessary fields. In some embodiment, the driver elements are capable of providing at least up to 1000 operating volts and including at least up to 1 amp operating currents. These values should not be considered limiting; all operating voltages and current are contemplated.

In a preferred embodiment, a control element incorporates an operating procedure to provide signals to driver elements, and hence, field control points 120. As signals are delivered to control points 120, electro-magnetic fields are generated between neighboring control points 120 causing the fuel to flow through the material of main body 110, which in turn generates heat. The control element can adjust modulation of the fields to alter various parameters associated with heat generation. For example, parameters could include one or more of heat modulation, heat maximization, stabilization and minimization, heat suppression, fuel control, fuel loading, fuel purging, fuel monitoring and fuel feedback. In preferred embodiments the control mechanism working through the driver elements and control electrodes may produce fuel clustering or group fuel so as to produce higher fuel density in at least one cluster or region 130.

In some embodiments, the fields between control points 120 can be controlled as desired to generate desirable motion of the fuel within main body 110. Desirable field effects can include rotary motion, a-periodic motion, oscillatory or non-uniform motion or "superwave" effects among others. The frequency components of motion control signals may be single or multiple frequencies. In still further embodiments characteristics of control signals may be time varying.

In further preferred embodiments provisions for maintenance or repair may include methods of removability of all or fewer components.

Figure 2:
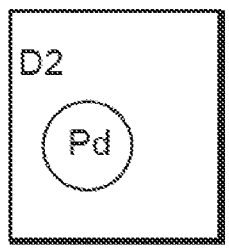
FIG. 2 represents a slide of recent findings in support of heat generation due to a fuel—dopant interaction.

FIG. 2 represents a slide discussing recent finding in support of heat generation due to a fuel—dopant interaction. Deuterium (e.g., D2) has been shown to generate heat in the presence of Palladium dopants within a ceramic power or matrix as discussed by Kitamura et al. in Physics Letters A, Aug. 24, 2009.

Figure 3:
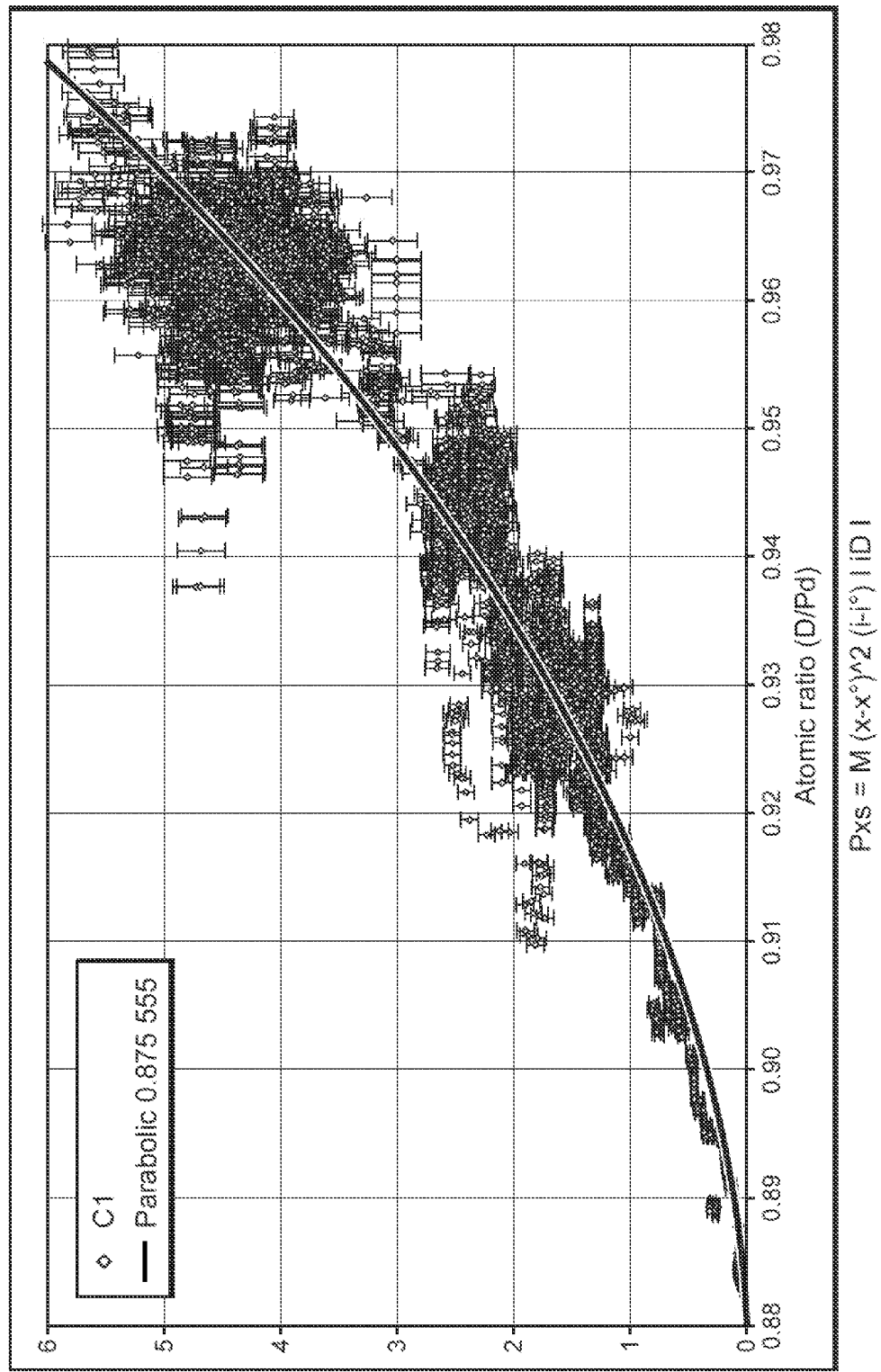
FIG. 3 illustrates a graph of power generated versus a ratio of fuel-to-dopant.

FIG. 3 illustrates power generated (e.g., heat) versus a ratio of fuel-to-dopant. Power generated (e.g., $P_{xs}$) appears to depend on the square of the difference between the cross sectional areas of the construction region and the main body.

Figure 4:
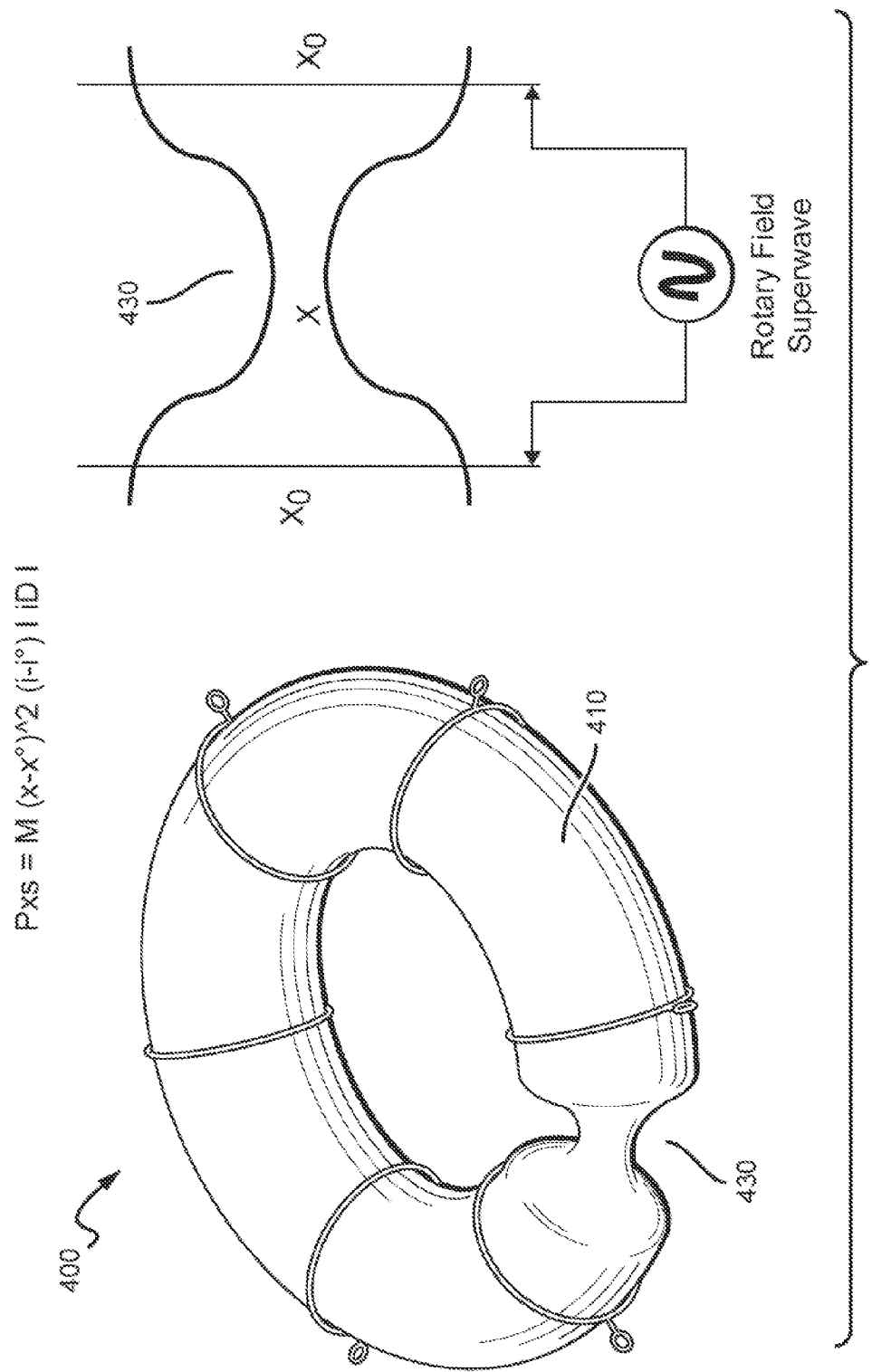
FIG. 4 provides schematic illustrating possible benefits of constriction geometry.

FIG. 4 provides additional details regarding benefits of the geometry of a constriction region with respect to heat produced. Constriction region 430 of element 400 is graphically represented as having a smaller cross sectional area X than the cross sectional area $X_o$ of main body 410. Fuel can be driven through constriction region 430 by one or more driving field, a rotary field for example as shown.

It is also contemplated that the main body could comprise one or more chambers through which a medium could pass. The medium could be used to capture or retain produced energy. For example, in embodiment where energy is emitted as heat, the medium could include a liquid that is heated to transport heat away from the main body. Such configuration would provide for an energy exchange loop where the medium carries excess energy away from the main body and returns after being depleted of the energy. Such approach provide for applications possibly including wall heating, floor heating, or other applications.

Thus, specific compositions and methods of the inventive subject matter have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A heating element comprising:
   a main body comprising a solid state matrix that is porous to a fuel species susceptible to an electro-magnetic field, the solid state matrix comprising a plurality of pores and a dopant that interacts with the fuel species, wherein the main body comprises an oxide selected from the group consisting of zirconium oxide, barium oxide, and cerium oxide; and
   a plurality of field control points in electrical communication with a plurality of driver elements and synchronized by a control element, wherein the plurality of field control points are configured to generate electro-magnetic driving fields that cause the fuel species to move through the solid state matrix.

2. The heating element of claim 1, wherein at least one field control point of the plurality of field control points is at least partially accessible external to the solid state matrix.

3. The heating element of claim 1, wherein at least one field control point of the plurality of field control points is at least partially embedded in the solid state matrix.

4. The heating element of claim 1, wherein the interaction comprises a release of energy.

5. The heating element of claim 4, wherein the release of energy comprises a release of heat.

6. The heating element of claim 1, wherein at least one of the field control points is constructed to change state at a predetermined temperature.

7. The heating element of claim 1, wherein the driving fields comprises a dynamic electro-magnetic field.

8. The heating element of claim 7, wherein the dynamic electro-magnetic field induces at least one of the group consisting of a rotary motion, periodic motion, oscillatory motion, non-uniform motion, and a superwave motion in the fuel species.

9. The heating element of claim 1, further comprising a coating material at least partially covering the main body, where the coating material is at least partially impermeable to the fuel and is configured to retain the fuel within the main body.

10. The heating element of claim 1, further comprising a fuel inlet.

11. The heating element of claim 1, further comprising a waste outlet.

12. The heating element of claim 1, wherein the dopant is selected to generate a signaling event that is independent of production of heat in the presence of a fuel—dopant interaction, wherein the signaling event is selected from the group consisting of a phonon emission, a photon emission, and a particle emission.

13. An apparatus comprising:
    a main body of a material that is porous to a fuel susceptible to an electro-magnetic field, the material comprising a dopant;
    a plurality of field control points configured to generate driving fields that cause the fuel to move within the main body; and
    at least one interaction region in the main body configured to induce an interaction of the fuel with the dopant under influence of the driving field, wherein at least one control point of the plurality of field control points is at least partially embedded in the material.

14. An apparatus comprising:
    a main body of a material that is porous to a fuel susceptible to an electro-magnetic field, the material comprising a dopant;
    a plurality of field control points configured to generate driving fields that cause the fuel to move within the main body; and
    at least one interaction region in the main body configured to induce an interaction of the fuel with the dopant under influence of the driving field, wherein the interaction region comprises a constriction region.

* * * * *